United States Patent

Doebrich et al.

[11] Patent Number: 5,845,086
[45] Date of Patent: Dec. 1, 1998

[54] SYSTEM FOR ADDRESSING A DESTINATION STATION USING ONLY ADDRESS OF A NETWORK JUNCTION AND STATION LINK IDENTIFIER IN A NETWORK WITH PLURALITY OF SEGMENTS

[75] Inventors: Udo Doebrich, Karlsbad; Reiner Buehler, Kraichtal, both of Germany

[73] Assignee: Siemens Aktiengesellschaft, München, Germany

[21] Appl. No.: 817,004
[22] PCT Filed: Sep. 15, 1995
[86] PCT No.: PCT/DE95/01277
§ 371 Date: Oct. 14, 1997
§ 102(e) Date: Oct. 14, 1997
[87] PCT Pub. No.: WO96/10308
PCT Pub. Date: Apr. 4, 1996

[30] Foreign Application Priority Data

Sep. 29, 1994 [DE] Germany ............ 44 34 952.1

[51] Int. Cl.$^6$ ................................. G06F 13/00
[52] U.S. Cl. ................ 395/200.68; 395/200.57; 395/200.72; 370/351; 370/355; 370/392; 370/401
[58] Field of Search ............ 395/200.68, 200.57, 395/200.72; 320/351, 355, 392, 401, 403, 379, 255, 395, 238, 389, 422, 408

[56] References Cited

U.S. PATENT DOCUMENTS

| | | | |
|---|---|---|---|
| 4,901,312 | 2/1990 | Hui et al. | 370/403 |
| 5,079,767 | 1/1992 | Perlman | 370/408 |
| 5,210,743 | 5/1993 | Eilenberger et al. | 370/422 |
| 5,265,092 | 11/1993 | Soloway et al. | 370/238 |
| 5,315,588 | 5/1994 | Kajiwara et al. | 370/389 |
| 5,327,421 | 7/1994 | Hiller et al. | 370/395 |
| 5,355,371 | 10/1994 | Auerbach et al. | 370/255 |
| 5,365,524 | 11/1994 | Hiller et al. | 370/376 |
| 5,452,297 | 9/1995 | Hiller et al. | 370/395 |

FOREIGN PATENT DOCUMENTS

| | | |
|---|---|---|
| 0 537 408 | 4/1993 | European Pat. Off. . |
| 40 00 673 | 7/1991 | Germany . |

OTHER PUBLICATIONS

M. Sveda, "Routers and bridges for small area network interconnection," *Computers in Industry*, vol. 22, No. 1, Jun. 1993, Amsterdam, pp. 25–29.

*Primary Examiner*—Le Hien Luu
*Attorney, Agent, or Firm*—Kenyon & Kenyon

[57] ABSTRACT

A process and a device for addressing stations in a network consisting of at least two segments (S1, S2, S3), wherein network junctions (N1, N2) are provided between the individual segments, which network junctions forward a message from a first segment (S1) to other connected segments (S2, S3) on the basis of path information contained in messages for addressing. The path information of a message to be forwarded through a network junction (N1) contains the station address, valid in the first segment (S1), of the network junction (N1) and an address extension containing a station link identifier for the network junction (N1), and with the help of said address extension the network junction (N1) inserts path information, valid in the other segment (S2), in the message for addressing the receiving station (E2, E3) and forwards it to the other segment (S2). The path information for each station link that can be established via a network junction are advantageously stored in a transmission table. Such transmission tables can be generated automatically by a special procedure in the network junctions.

4 Claims, 1 Drawing Sheet

SYSTEM FOR ADDRESSING A DESTINATION STATION USING ONLY ADDRESS OF A NETWORK JUNCTION AND STATION LINK IDENTIFIER IN A NETWORK WITH PLURALITY OF SEGMENTS

FIELD OF THE INVENTION

The present invention relates to a process and a system for addressing stations in a network which contains two or more segments.

BACKGROUND INFORMATION

The transfer protocol of PROFIBUS, capable of being connected to a network consisting of a plurality of segments, is described in DIN 19245, Part 1. Network junctions connecting the segments are provided between the individual segments to enable stations of different segments to communicate. In order to address the receiving station, messages contain path information providing at least the address of the receiving station. At this address, the receiving station identifies a message addressed to it. The address can be an individual address for addressing a single station or a collective address for addressing several or all members in the system. Each station has an individual address, which is unique to the particular segment to which the station is connected.

German Published Patent Application No. 40 00673 Express Mail No.: EM 271950450 US describes inputting the station address of the receiving station, which is valid in that station's segment, as well as the segment addresses of the segments through which the message is to be forwarded. According to this related art, a transmitting station wishing to communicate with a receiving station must have the required information concerning the full message path saved in a storage device and insert this information in the message. For each message, network junctions must check whether the segment numbers contained in the path information agree with the numbers of the segments they connect and, if so, forward the message. The disadvantage of this related art is that the number of segment addresses in the path information increases in the case of large networks according to the number of segments involved in the transmission, and therefore the useful data length to total message length ratio decreases. Furthermore, considerable storage space is required for storing the extensive path information for all station links in each station. To remedy this problem, the aforementioned document proposes including only the station address and station segment number in the path information when addressing a receiving station. The network junctions then carry a list of segments that can be reached through them and only forward a message if the number of a reachable segment is contained in the path information. While this process reduces the amount of data required for the path information of the messages, problems may arise if the network structure changes or a receiving station is moved to another segment.

SUMMARY OF THE INVENTION

An object of the present invention is to provide a process for addressing stations in a network consisting of at least two segments, wherein a favorable useful data length to total message length ratio is achieved and wherein the segment number of a receiving station does not need to be transmitted even for messages transmitted over a plurality of segments, as well as a device suitable for carrying out the process.

According to the present invention, a message intended for a station in another segment is addressed by the transmitter of the message to the corresponding network junction connected to the same segment with a station link identifier for the network junction. The network junction can then determine the address to which the message is to be forwarded through the station link identifier with the help of the information stored in the network junction and it can forward the message. If another network junction is located in the path, it is addressed, i.e., the same principle is used again. The message is then provided with the new destination address in the network junctions and transmitted to the next network junction or from the last network junction to the receiving station.

DETAILED DESCRIPTION

Figure 1:
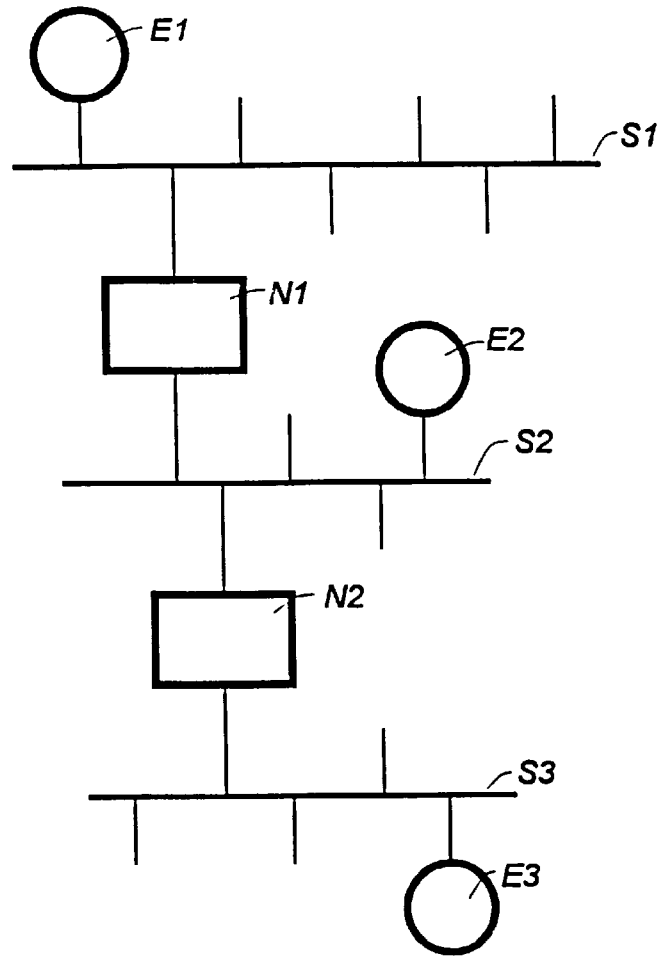
FIG. 1 shows a network with three segments, in accordance with the present invention.

In a network according to FIG. 1, a station E1 is located in a segment S1, connected to a second segment S2 via a network junction N1. Segment S2 is in turn connected to a third segment S3, where station E3 is located, via network junction N2. A station E2 is connected to Segment S2. If station E1 (transmitting station) wishes to transmit a message to station E3 (receiving station), it must know the identifier of the corresponding station link and that E3 can be reached via network junction N1. Therefore, E1 addresses N1 in segment S1 and transmits the station link identifier to N1 in a path information string. The information that the message of this station link must pass through N2 and the station link identifier for N2 is stored in N1. Therefore it inserts this identifier in the message and addresses the message in segment S2 to network junction N2. Network junction N2 finally identifies the address of receiving station E3 for this station link, since station E3 is connected to the same segment, and forwards the message to it. It is advantageous that each station be capable of addressing one or more other station in another segment without knowing their location in the network or their addresses in the segment. Each transmitting station should only know through which network junction the respective station(s) can be reached, i.e., the address of this network junction in the station's own segment and the station link identifier. Another advantage is that, from the transmitting station's point of view, the functionality of the receiving station seems to reside in the network junction located in its own segment. The station link identifier is comparable to a service access point known from DIN 19245, Part 1 (LSAP-Link Service Access Point) and can be transmitted accordingly. The functions concentrated in the receiving stations can be called through a network junction using the station link identifier, as in receiving stations where different services or functions of the receiving station can be addressed through the address extension with an LSAP. To the transmitting station, these services seem to be concentrated in the network junction. Therefore each station only needs to know the addresses of the other stations, including the network junctions connected to its own segment. Knowledge of the structure of the entire network or of the segments located beyond a network junction is hidden to the station and is not needed.

Yet each network junction, when it receives a message, must know where, i.e., to which address, and with what station link identifier it should forward it. For this purpose each network Junction needs a memory area from which the receiving station address, valid in the other segment, can be obtained for each station link. This memory area will be henceforward referred to as a transmission table. The exact format of the transmission table is not established. If a transmitting station wishes to communicate with a plurality of receiving stations consecutively, the network junction maintains a plurality of station links for this transmitting station. The transmission table contains an entry for each of these station links.

Figure 2:
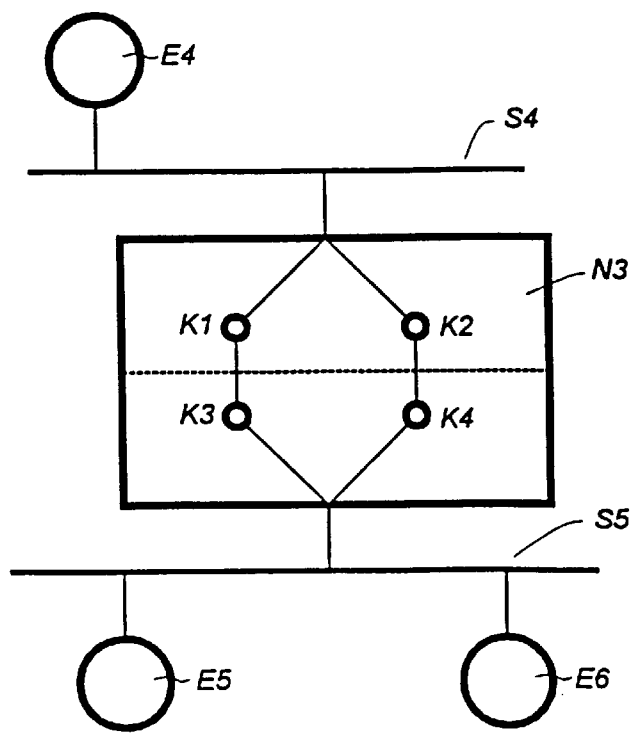
FIGS. 2 shows the possible station links for a network junction, in accordance with the present invention.

FIG. 2 shows an example of a network junction N3 that carries a plurality of station links. A segment S4 with a station E4 is connected, via network junction N3, to a segment S5, to which stations E5 and E6 are connected. A communication channel is set up in network junction N3 for each possible station link. A message from station E4 (transmitting station) to station E5 (receiving station) is first transmitted in segment S4 to network junction N3, which has the address 21 in segment S4. At the same time, a station link identifier K1 is transmitted to network junction N3. Using the transmission table, where address 9 of receiving station E5 in segment S5 is stored, the destination address of the message in segment S5 is obtained, and the message is forwarded. Station E4 also addresses a message intended for station E6 to network junction N3 with the address 21 in segment S4, however, it inserts K2 in it as the station link identifier. According to another entry in the transmission table for this communication channel, network junction N3 forwards this message to address 16 of receiving station E6 in segment S5. If, conversely, station E5 wishes to transmit a message to station E4, it addresses the message to address 3 of network junction N3 in segment S5 and communicates to it station link identifier K3. Network junction N3 finds the address 7 of receiving station E4 under identifier K3 and transmits the message to it. The transmission of a message from transmitting station E6 to receiving station E4 takes place in a similar manner using station link identifier K4.

Groups of stations or all the other stations can be receivers of a message.

The present invention has the advantage that, contrary to the known solutions, the load on stations E1, . . . , E6 is reduced as they do not need to store path information in the form of lists of segment addresses for the links to other stations. Neither do they need any information on the structure of the network. This information is distributed over the network and it is available only where it is needed, namely in the network junctions N1, . . . , N3. The resources used by stations E1, . . . , E6 are also reduced by the fact that they do not need to distinguish between intrasegment communications, i.e., those taking place in the same segment, and extrasegment communications, which occur across segment boundaries. In previous processes, where stations insert the segment addresses of the receiving station in the path information of a message, stations set up for communication in a single segment only and incapable of working with segment addresses, must be either upgraded, for example, through reprogramming, or replaced with new machines when the network is expanded to contain more segments, so they can communicate with stations in other segments. In the process according to the present invention, this is not necessary. A station enabled to have an LSAP address extension needs no function upgrade for communication across segment boundaries. The effects of address or network structure changes, e.g., changes in segment numbers, additions of new segments, or moving a station to another segment, are limited to the immediate environment, i.e., to the affected segments. Neither do such changes affect the stations in the other segments. In the known processes that work with segment addresses in the path information the segment addresses or station addresses for addressing receiving stations must also be changed in the stations located in other segments that communicate with the directly affected stations. The present invention can also be used in networks consisting of segments of different types, since adjustment to another type of communication may take place in the network junctions. The properties of the different subnetworks are isolated through the network junctions. In addition, using the addressing according to the present invention, less resources are used in the stations, since the station must only evaluate, in a message input filter, the addresses that are valid in the given segment in order to determine whether the message is intended for it. Other addresses, such as segment addresses, do not need to be evaluated.

The transmission tables can basically be prepared manually and loaded in the network junctions, but it is also possible to generate them automatically in the network junctions using the following method. One prerequisite for the method is that each station must have an identifier that is unique in the network. Let us assume, for example, that a station link is to be established between station E1, representing a control system L1 and station E3, a temperature sensor S11, in the network of FIG. 1. The control system L1 needs the temperature measured by sensor S11 for its control function. For this purpose, station E1 transmits a special search message in its own segment S1 containing, in addition to its own transmitter address valid in segment S1, the designation S11 of the temperature sensor sought and an identifier as a search message. This message is evaluated first in the stations connected to segment S1, including the network junctions (for the sake of simplicity represented by network junction N1 in FIG. 1). The station whose identifier agrees with the identifier transmitted responds to the searching station E1, which means none in this case, since station E3 is not connected to segment S1. A search message must first pass through the network junctions connected to the segment, so it can reach all the stations in the network. Since at this point only some transmission tables exist or none at all, the message goes through a special communication channel, which is operational from the very beginning and requires no entry in the transmission table. Thus, in the present embodiment, network junction N1 forwards the search message transmitted by E1 to segment S2. At the same time, it temporarily stores the address of station E1, valid in segment S1, for a predefined time period and inserts its own address valid in segment S2 in the search message. Station E2 processes the search message, but it does not find its identifying designation in it, so it does not respond. Network junction N2 inserts its address, valid in segment S3, in the message again, transmits it to segment S3 and temporarily stores the address of network junction N1 valid in segment S2. Station E3 finally receives the search message and recognizes its identifying designation S11 in it. It transmits a response message to network junction N2 with its address valid in segment S3. Upon receipt of the response message, network junction N2 enters a new station link identifier and inserts inpath information, which requires an address valid in segment S3 of station E3. At the same time, it transmits a response message containing its address valid in segment S2 and the new station link identifier to network junction N1 via segment S2. Network junction N1 also enters a new station link identifier in its transmission table and inputs the data received from network junction N2.

Finally, network junction N1 transmits a response message to the seeking station E1, which contains its station link identifier and its address valid in segment S1. As the response message is received by station E1, the transmission information has already been stored in all the network junctions involved, i.e., the path is open for communication. This process is repeated for each required link between the network stations. In this way, all the transmission tables required in the network junctions are generated automatically.

This process advantageously reduces the resources used by the stations for establishing a station link. If the transmission tables were first generated in an organization system on the basis of the responses and then loaded into the network junctions, a considerably greater storage space would be needed in the organization system. In the novel process, this need no longer exists, since only the information of the connected segments that is relevant for the specific station link (but not the transmission tables) for the entire network is needed. The time required and the network load are also reduced, since the transmission tables are generated automatically in the network junctions and do not need to be retransferred there. The novel process also implies simplification of the network junctions, since no transfer procedures are needed for the tables.

Contrary to a process where the table is loaded, in the process of the present invention, the format of the table does not need to be exactly established. The tables are generated locally in the network junctions; therefore the process is advantageously more flexible when the network junctions connect segments of different types, for example, segments with different address structures. Path information with different structures, optimized for the properties of each segment, can be entered into the transmission tables for different directions of transmission. In this case it is advantageous if a separate transmission table is set up for each direction of transmission.

What is claimed is:

1. A process for addressing stations in a network containing at least two segments and network junctions arranged between the at least two segments, wherein the network junctions forward a message from a first of the at least two segments to another of the at least two segments on the basis of path information contained in an addressing message, the process comprising the steps of:

forwarding a message through one of the network junctions, the message including path information containing a station address of the network junction and an address extension, wherein the station address is valid in the first segment and the address extension includes a station link identifier, which address extension uniquely identifies for the network junction a link that is to be established in the network between a transmitting station and a receiving station via the network junction;

forwarding, from the network junction, the message to another segment if the station address of the network junction agrees with the received station address in the path information; and updating, at the network junction in accordance with the station link identifier, the path information of the message for addressing the receiving station, wherein the path information is valid in the other segment.

2. The process of claim 1, wherein the one network junction obtains the path information which is valid in the other segment from a table which includes an entry for each link that can be established via the network junction.

3. The process of claim 2, wherein each station in the network has a unique identifying designation, and wherein:

to establish a new station link, a transmitting station transmits a search message containing the address of the transmitting station valid in the first segment and an identifying designation of the receiving station, each station evaluates the search message and determines whether the identifying designation in the search message agrees with the identifying designation of the respective station;

the network junction stores the identifying designation of the station emitting the search message in the first segment and forwards the search message to the other segment, inserting in the search message the address valid in the other segment, a receiving station whose identifying designation agrees with that of the one received transmits back to the transmitting station a response message, which is to be used for the station link, with the address of the receiving station which is valid in the respective segment; and a network junction receiving a response message stores an entry with the valid path information for addressing the receiving station as a new station link identifier in the network junction's table, and forwards the response message with its address valid in the respective segment and the new station link identifier.

4. A network comprising:

at least two segments; and a network junction between each of the segments, which network junction forwards a message from a first segment to a second segment on the basis of path information contained in the message, wherein:
      the path information of the message to be forwarded through a network junction contains a station address of the network junction and an address extension, wherein the station address is valid in the first segment;
      the address extension contains a station link identifier uniquely identifying for the network junction a link that is to be established between a transmitting station and at least one receiving station in the network via the network junction; and
      the network junction is configured so that it forwards the message to another segment if its station address agrees with the received station address in the path information and, on the basis of the station link identifier, updates the message's path information, valid in the other segment, for addressing the receiving station.

* * * * *